US00RE38867E

(19) United States
(12) Reissued Patent
Kusters

(10) Patent Number: US RE38,867 E
(45) Date of Reissued Patent: Nov. 8, 2005

(54) DEVICE FOR TURNING A SHEET WITH A SIMULTANEOUS CHANGE IN CONVEYING DIRECTION

(75) Inventor: Johannes J. M. Kusters, Zwanenburg (NL)

(73) Assignee: Böwe Bell & Howell, Lincolnwood, IL (US)

(21) Appl. No.: 08/747,147

(22) PCT Filed: Apr. 13, 1992

(86) PCT No.: PCT/EP92/00829

§ 371 (c)(1),
(2), (4) Date: May 4, 1993

(87) PCT Pub. No.: WO93/01115

PCT Pub. Date: Jan. 21, 1993

Related U.S. Patent Documents

Reissue of:
(64) Patent No.: 5,362,039
Issued: Nov. 8, 1994
Appl. No.: 08/050,235
Filed: May 4, 1993

(30) Foreign Application Priority Data

Jul. 4, 1991 (DE) ..... 4122214

(51) Int. Cl.[7] ..... B65H 5/00
(52) U.S. Cl. ..... 271/225; 271/183; 271/186
(58) Field of Search ..... 271/225, 272, 271/275, 273, 184–186, 183

(56) References Cited

U.S. PATENT DOCUMENTS

| | | | | |
|---|---|---|---|---|
| 799,349 A | | 9/1905 | Massey | |
| 1,469,168 A | | 9/1923 | Mets | |
| 1,630,713 A | | 5/1927 | Meyer | |
| 3,179,406 A | * | 4/1965 | Harrington | 271/186 |
| 3,215,428 A | * | 11/1965 | Rehm | 198/402 |
| 3,401,930 A | | 9/1968 | Bishop | 271/52 |
| 3,548,783 A | | 12/1970 | Knapp | 118/224 |
| 3,661,383 A | | 5/1972 | Morrison | |
| 3,717,075 A | | 2/1973 | Lopez | 93/93 M |
| 3,791,269 A | * | 2/1974 | Sawada | 271/258.01 |
| 4,019,435 A | | 4/1977 | Davis | 101/232 |
| 4,027,870 A | | 6/1977 | Frech et al. | 271/65 |
| 4,078,489 A | | 3/1978 | Davis | 101/141 |
| 4,139,190 A | | 2/1979 | Keyt et al. | 271/183 |
| 4,151,038 A | | 4/1979 | Bottasso et al. | 156/507 |

(Continued)

FOREIGN PATENT DOCUMENTS

| | | | |
|---|---|---|---|
| BE | 634551 | 7/1963 | 271/186 |
| CH | 659809 | 2/1987 | |
| DE | 2417614 | 10/1975 | |
| DE | 2529103 | 1/1976 | 271/186 |
| DE | 3150825 | 7/1982 | |

(Continued)

OTHER PUBLICATIONS

Report of Donald Barker Pursuant To FED. R. CIV. p. 26 (a)(2)(B) (Nov. 21, 1997).
Statement of Roman Golicz (Feb. 12, 1998).

(Continued)

*Primary Examiner*—Patrick Mackey
(74) *Attorney, Agent, or Firm*—McDermott, Will & Emery

(57) ABSTRACT

Sheets or sets of sheets are turned very rapidly and reliably, especially after the cutting of endless stationery, conveyed further in a different transport direction and separated in that the leading edge of each sheet is taken to a diagonal bending slot (33) via which a corner of each sheet first reaches an output slot (49).

19 Claims, 3 Drawing Sheets

U.S. PATENT DOCUMENTS

| | | | | |
|---|---|---|---|---|
| 4,154,180 | A | 5/1979 | Burton | 112/262.3 |
| 4,240,336 | A | 12/1980 | Grevich et al. | 493/196 |
| 4,266,762 | A | 5/1981 | Kramer et al. | 271/225 |
| 4,367,997 | A | 1/1983 | Schweingruber | 414/38 |
| 4,411,418 | A | 10/1983 | Poehlein | 271/236 |
| 4,413,723 | A | 11/1983 | Stobb | 198/415 |
| 4,456,242 | A | 6/1984 | Morin | 271/94 |
| 4,509,703 | A | 4/1985 | Grunder | 242/59 |
| 4,570,923 | A | 2/1986 | Hooper et al. | |
| 4,724,945 | A | 2/1988 | Martin | 198/412 |
| 4,756,521 | A | 7/1988 | Martin | 271/225 |
| 4,786,041 | A | 11/1988 | Acquaviva et al. | |
| 4,790,126 | A | 12/1988 | Boeckmann | 53/451 |
| 4,844,442 | A | 7/1989 | Gämmerler | 271/225 |
| 4,879,571 | A | 11/1989 | Plasscheart | 355/26 |
| 4,909,374 | A | 3/1990 | Skrypalle | 198/371 |
| 4,911,422 | A | 3/1990 | Auerbach | 271/225 |
| 4,924,652 | A | 5/1990 | Krasuski et al. | |
| 4,925,178 | A | 5/1990 | Clabbers et al. | 271/186 |
| 4,932,798 | A | 6/1990 | Kardinal et al. | 400/120 |
| 4,968,017 | A | 11/1990 | Depetris | 271/12 |
| 5,004,220 | A | 4/1991 | Dreschel et al. | 271/184 |
| 5,149,076 | A | 9/1992 | Stenz | 271/2 |
| 5,158,278 | A | 10/1992 | Auf der Mauer | 271/270 |
| 5,188,355 | A | 2/1993 | Lowell et al. | 271/225 |
| 5,316,199 | A | 5/1994 | Hansen et al. | 226/197 |
| 5,333,851 | A | 8/1994 | Kulpa | 271/225 |
| 5,538,240 | A | 7/1996 | Auerbach et al. | |
| 5,649,698 | A | 7/1997 | Auerbach et al. | |
| 5,664,772 | A | 9/1997 | Auerbach et al. | |

FOREIGN PATENT DOCUMENTS

| | | | |
|---|---|---|---|
| DE | 159419 | 3/1983 | |
| DE | 3614103 | 10/1987 | |
| EP | 263058 | 4/1988 | |
| FR | 1394541 | 2/1965 | 271/186 |
| GB | 2151 | of 1903 | 226/197 |
| GB | 280782 | 11/1927 | 226/197 |
| GB | 729330 | 7/1952 | 226/197 |
| GB | 1110395 | 4/1968 | B65H/29/58 |
| GB | 1326893 | 8/1973 | |
| GB | 2099797 | 12/1981 | |
| GB | 2092115 | 6/1982 | |
| JP | 57759 | 5/1979 | 271/225 |
| JP | 140450 | 11/1980 | 271/225 |
| JP | 21667 | 1/1987 | 271/225 |
| JP | 117536 | 5/1990 | 271/186 |
| JP | 152845 | 6/1990 | 271/186 |
| JP | 41359 | 2/1992 | 271/225 |

OTHER PUBLICATIONS

Photographs of ITC Device I; taken Sep. 1997 by Applicant; date unknown, but has been alleged by the Defendant to be prior art.

Laser photocopies of photographs of ITC Device I; taken Sep. 1997 by Applicant; date unknown, but has been alleged by the Defendant to be prior art.

Video recording of ITC Device I; recorded Sep. 1997; date unknown, but has been alleged by the Defendant to be prior art.

Video recording of ITC Device II; date unknown, but has been alleged by the Defendant to be prior art.

Photocopies of photographs taken by Pitney Bowes; date unknown, but has been alleged by the Defendant to be prior art.

Photocopy of ITC SL 30 Slitter/Merger System brochure, date unknown, but has been alleged by the Defendant to be prior art.

Photocopy of diagram entitled Intelligent Technologies Corporation Slitter/Merger Paper Flow; date unknown, but has been alleged by the Defendant to be prior art.

Photocopy of brochure page, ITCSL30 Slitter/Merger System, pp. 1–3, author unknown, date unknown but believed to be prior art.

Photocopies (12 pages) of photographs, author unknown, date unknown but believed to be prior art.

*IBM Technical Disclosure Bulletin*, vol. 22, No. 5, Oct. 1979, pp. 1947–1948.

*Xerox Disclosure Journal*, vol. 7, No. 1, Jan./Feb. 1982, pp. 11–12.

* cited by examiner

DEVICE FOR TURNING A SHEET WITH A SIMULTANEOUS CHANGE IN CONVEYING DIRECTION

Matter enclosed in heavy brackets [ ] appears in the original patent but forms no part of this reissue specification; matter printed in italics indicates the additions made by reissue.

BACKGROUND

The invention relates to a device for turning a sheet with a simultaneous change in the conveying direction. Devices of this type are needed in case sheets or forms are transferred from a processing station, for example a printer or a copier, to a conveyor chain in order to be carried by the latter past further handling or processing stations, or to be composed, with additional sheets and forms, into a set of sheets or a set of forms.

A high operating speed is desirable when handling and processing sheets and forms, e.g. in mail processing machines. Disturbances, paper jams, and the like must be avoided since they can trigger a standstill of the entire facility and can lead to the destruction of documents which has grave consequences, for example, when processing bank mail.

Accordingly, it is an object of the invention to design a device for turning a sheet with a simultaneous change in conveying direction in such a way that a continuous flow of the sheets to be handled is ensured with a high operating speed, and breakdowns are avoided.

This object has been attained according to the invention by providing that the sheet is transported by means of a driving roller arrangement into an inlet slot defined by guide walls. The inlet slot meets a diagonally-extending bending slot, the axis of curvature of which is oriented substantially in parallel to the plane of the sheet and at an angle of preferably 45 degrees with respect to the leading sheet edge. The bending slot terminates in an outlet slot wherein outlet drive means are provided at least for seizing the sheet corner first entering the outlet slot. The outlet slot is located in a plane that is substantially parallel to the plane of the inlet slot, but spaced therefrom.

A multiple juxtaposition of devices of the type briefly described above makes it possible to turn a single sheet and discharge it with an altered conveying direction. It also permits independent processing of a plurality of sheets or form sections, (transported lying side-by-side in a plane) simultaneously with the turning step and the change in conveying direction. In this manner, after individual processing it is possible to correlate individual sheets or form sections, into separate sheet stacks or sets of forms.

SUMMARY

According to a preferred embodiment of the device proposed herein which, as mentioned above, can be provided in multiple juxtaposition, an inlet slot is formed between a cover plate and a guide plate. The cover plate includes a diagonally-curved rerouting flange extending into a diagonal recess of the guide plate to form a bending slot with the guide plate which exhibits a diagonal, substantially-cylindrical guide member located in opposition to the rerouting flange. Finally, the outlet slot and the outlet drive means are arranged on the side of the guide plate facing away from the cover plate.

Suitably, the outlet slot contains, on the one hand, sections of revolving conveyor belts traveling in the discharge direction and, on the other hand, counter-support roll elements, associated therewith, as the outlet drive means, wherein the roll elements are preferably formed by balls retained in cages of the guide plate.

It has proven to be advantageous to first convey the sheet or sheets to be handled into the zone of the drive roller arrangement in the inlet slot and, prior to passing the sheet or sheets on, to retain the latter, for example by means of a vacuum retaining unit, against the driving action of the driving roller arrangement. Only thereafter the sheet or sheets are released in a controlled fashion whereby a precise initial position of the respective sheet or sheets is attained during entrance into the rerouting slot.

BRIEF DESCRIPTION OF THE DRAWINGS

Embodiments will be described in greater detail below with reference to the drawings wherein.

DESCRIPTION

Figure 1:
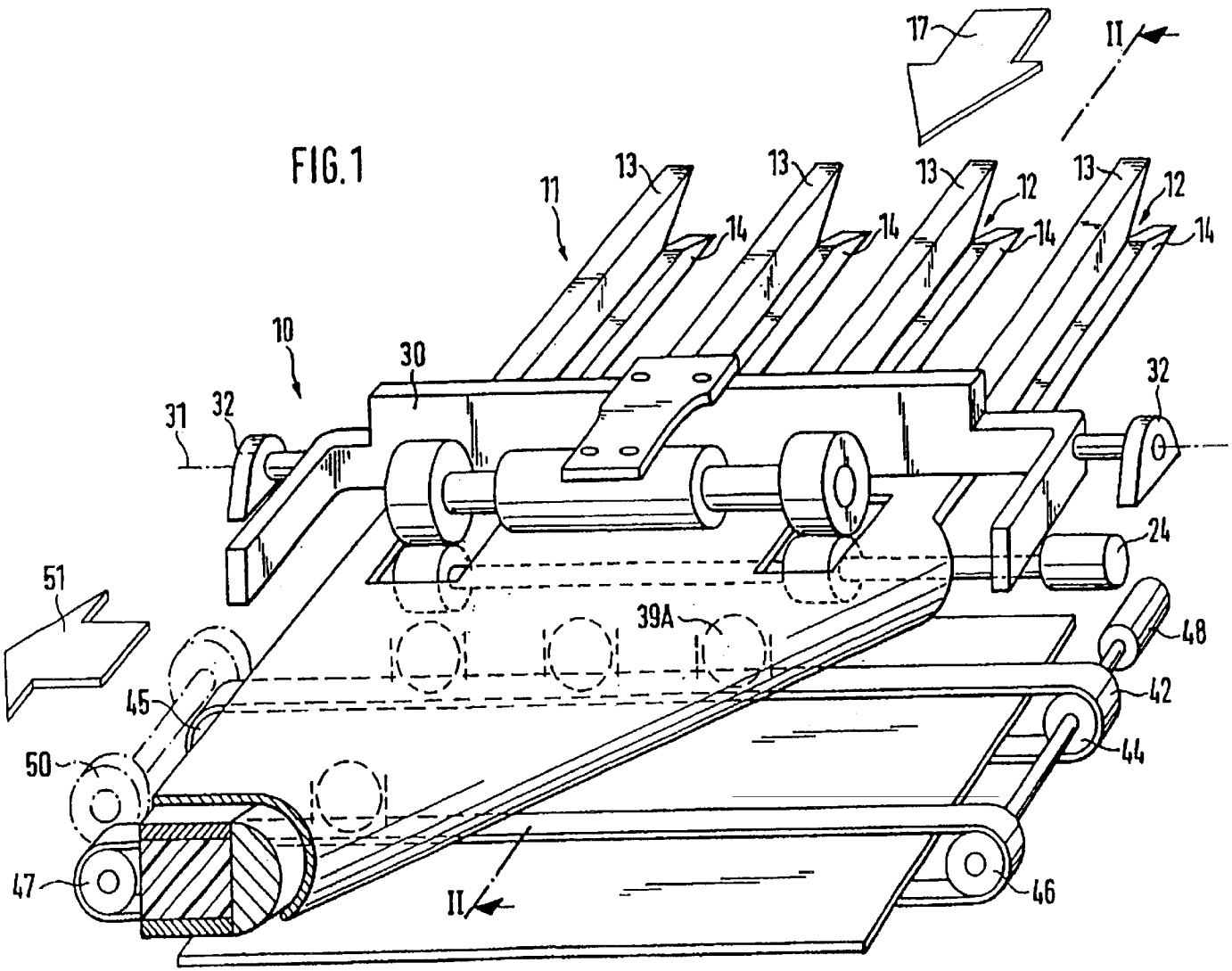
FIG. 1 is a schematic perspective view of a device for turning a sheet with a simultaneous change in conveying direction wherein certain supporting-frame parts have been omitted to simplify the illustration and to improve clarity.

Upstream of the device 10 in FIG. 1 a feeding unit 11 is arranged so that a feeding slot 12 is formed between pairs of mutually-opposed guide bars 13 and 14. The guide bars 13 can be held together by means of transversely extending connecting rods 15 (FIG. 2) while the guide bars 14 are held together correspondingly by transversely extending connecting rods 16.

Means arranged upstream of the feeding unit 11 transports a sheet, such as might be cut from an endless form by a cutter, into the feeding slot 12 in the direction of arrow 17. The sheet is fed into the inlet slot 12 until the leading sheet edge projects past the feeding slot 12 and passes into an inlet slot 18 (FIG. 2) for turning and changing the conveying direction. In this respect, a driving-roller arrangement 21 and 22 projects by way of cutouts of guide walls 19 and 20 into the inlet slot 18. These rollers 21 and 22 seize the forward edge of the sheet 12 and pull it further into the inlet slot 18.

Before the sheet to be handled has been pulled by the driving roller arrangement 21 and 22 completely into the inlet slot 18, however, a vacuum retaining unit 23 (FIG. 2) blocks further movement of the sheet. In this respect, the idler rollers 21 are freewheeling while the lower driving rollers 22 are driven by motor 24 of the driving roller arrangement, but rollers 22 are not equipped with a friction coating and do not overcome the retaining force of the vacuum retaining unit 23. The vacuum of the retaining unit 23 is obtained from a vacuum source 27 and delivered through a control valve 26 and ducts 25 to vacuum retaining openings of the guide bars 14. The respective sheet position at which the vacuum retaining unit 23 is turned on or deactivated is determined by means of a conventional position indicator 28 in the form of a photocell and a control unit 29.

Figure 2:
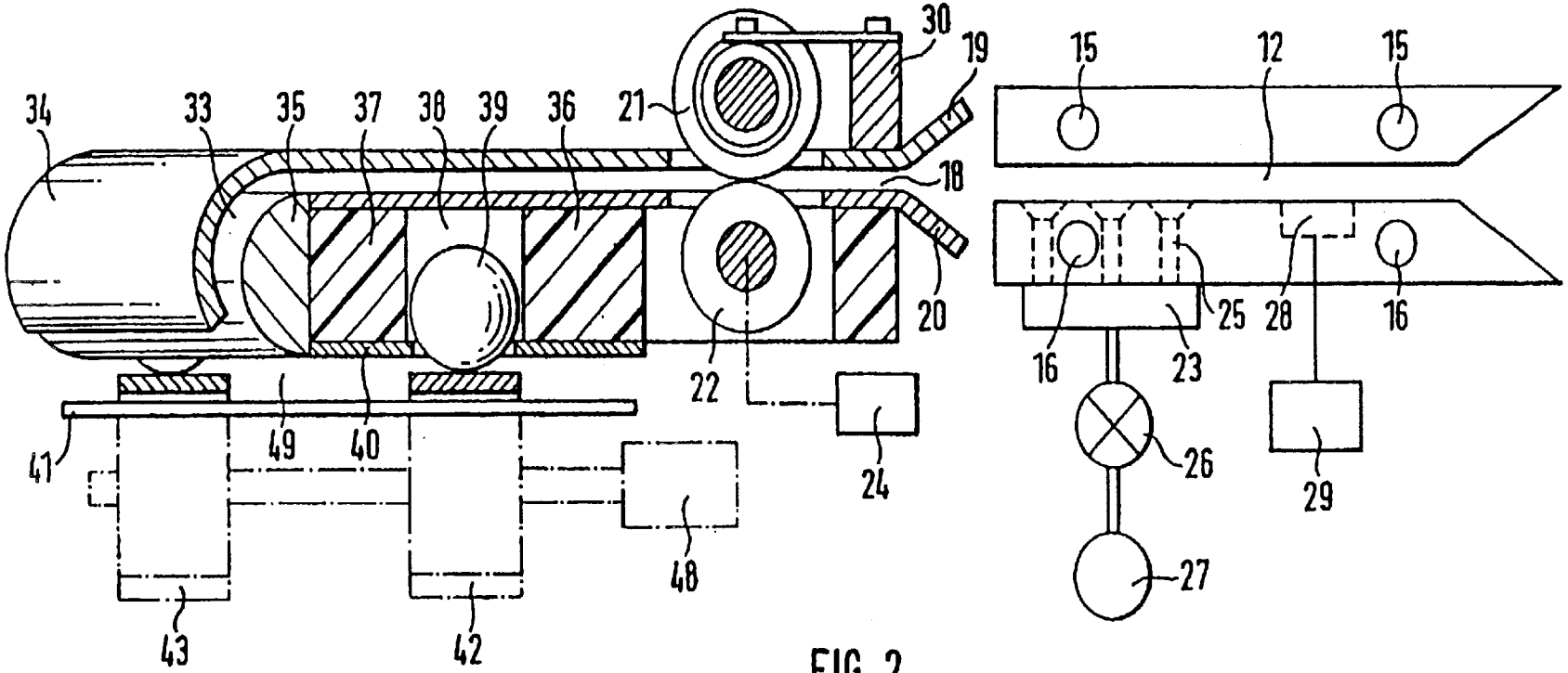
FIG. 2 is a sectional view of the device taken along the lines II—II in FIG. 1.

The guide walls 19 and 20 converge, in the manner shown in FIG. 2, from the inlet side toward the inlet slot 18. The upper guide wall 19 and the rollers 21 are attached to a swivel yoke 30 which is swingable upwardly about a swivel axle 31 supported in bearing blocks 32 (FIG. 1) to lift the upper guide wall 19 and the rollers 21 off the lower guide wall 20 and driving rollers 22. In this manner, the inlet slot 18 is accessible. As can be seen from FIGS. 1 and 2, a diagonally-extending bending slot 33 is defined, on the one hand, by a diagonal, curved rerouting flange 34 of the upper guide wall and, on the other hand, by a diagonal, substantially-cylindrical guide member 35 located in opposition to the rerouting flange. The upper guide wall 19 and the lower guide wall 20 extend in the conveying direction of the driving roller arrangement up to the diagonally-extending bending slot 33; and, the axis of curvature of the slot 33 is oriented substantially parallel to the plane of the inlet slot and thus to the plane of the sheet to be handled. The illustrated slot 33 is at an angle of 45 degrees with respect to the leading sheet edge.

The upper guide wall 19 is thusly fashioned as a comparatively-rigid cover plate which projects into a diagonal recess of the lower guide wall 20, oriented at 45 degrees to the conveying direction of the driving roller arrangement wherein the diagonal forward edge of the lower guide wall 20 is terminated by the guide member 35. The lower guide wall 20 also forms the upper termination of a guide member 36, a central layer 37 of which is comprised, for example, of polytetrafluoroethylene and is provided with cage recesses 38 wherein roll elements or balls 39 are accommodated. These balls are retained in the cage recesses 38 by means of a lower, end wall 40 of the guide plate 36. The lower end wall 40 is equipped with conventional recesses of adequate diameter and oriented toward the cage recesses 38 in such a manner that the roll elements 39 project in the downward direction through the cutouts of the lower, end wall 40. It can also be seen from FIG. 2 that the central layer 37 of the guide plate 36 is provided with recesses in such a way that the driving rollers 22 of the driving roller arrangement can be accommodated therein. These rollers extend upwardly into the inlet slot 18 through the cutouts of the lower guide wall 20.

A table 41 is located underneath the guide member 36 and the top sides of conveyor belts 42 and 43 are guided over this table as shown. These conveyor belts are placed over drive rollers 44 and 46 (driven by motor 48) and idler rollers 45 and 47 arranged at the beginning and at the end of the table 41 respectively.

The lower end wall of the guide plate 36, on the one hand, and the table 41, on the other hand, define an outlet slot 49 lying in a plane oriented in parallel to the plane of the inlet slot 18 and spaced therefrom by a distance corresponding essentially to the thickness of the guide member 36. The upper sections or the upper faces of the conveyor belts 42 and 43, on the one hand, and rows of roll elements 39 respectively aligned with the conveyor belts, on the other hand, are effective in the outlet slot 49 as the transport means. This relationship can be readily seen by one skilled in the art from FIGS. 1 and 2.

On the outlet side of the conveyor belts 42 and 43, are a pair of casters 50, indicated in dot-dash lines in FIG. 1 and located in opposition to the rollers 45 and 47. Between the casters of the caster pair 50 a disk traveling therewith can be arranged. This is not shown in FIG. 1. The disk is dimensioned in its diameter in such a way that it projects somewhat into the profile of the outlet slot 49 and thus imparts to the discharged sheet a slight transverse bulge whereby the stability of the discharged sheet is increased in a desirable fashion.

During operation, a sheet, cut off, for example, from an endless form, is introduced from a cutter in the direction of arrow 17 into the feeding unit 11 and advanced to such an extent that the forward edge of the sheet is finally seized by the driving roller arrangement (21, 22) in the inlet slot 18 and is further advanced in the inlet slot 18. During this step, the rearward sheet-edge finally travels past a feeler 28 which produces a signal and causes a control unit 29 to activate the vacuum retaining unit 23 by opening the valve 26. In this manner, at this point, the sheet is retained by the vacuum suction openings at the outer end of the ducts 25, and the driving rollers 22 initially merely idle underneath the portion of the sheet that is present in the inlet slot 18.

When the sheet is released again by closing the valve 26 and shutting off the vacuum retaining unit 23, the driving roller arrangement 21, 22 pushes the sheet forward in the inlet slot so that initially the sheet corner located on the left in FIG. 1 will reach the bending slot 33 and is bent downwards at an angle of 45 degrees. This continues until the sheet corner has reached the outlet slot 49 and is seized between the conveyor belt 42 and the ball denoted by 39A in FIG. 1.

The conveying speed of the conveyor belts 42 and 43 in conjunction with the roll elements 39 is preferably higher than the conveying speed of the driving roller arrangement 21, 22. Hence, the sheet to be handled, as soon as its corner lying on the right in FIG. 1, is seized between the conveyor belt 42 and the roll element or the ball 39A and is pulled with increased velocity from the inlet slot 18 into the outlet slot 49. The initially-prevailing contact with the inside of the rerouting flange 34 is then changed to contact with the outer surface of the guide member 35 and the sheet precisely follows the diagonal bend of the guide member 35 in such a way that, based on the 45 degree orientation of the guide member 35, the conveying direction of arrow 51 is obtained in the outlet slot 49 which is at 90 degrees with respect to the feeding direction of arrow 17.

In practical embodiments of the device set forth herein and schematically shown in FIGS. 3, 3a, 3b, 3c, and 3d, the feeding unit 11 as well as the unit 10 comprise several juxtaposed sections, wherein the swivel yoke 30 and the swivel axle 31 extend in one piece over these several sections and are equipped in each case with sets of rollers 21 corresponding to the arrangement shown in FIG. 1. Cover-plate sections 19 with rerouting flanges 34, respectively associated with the aforementioned sections, are attached to the swivel yoke 30 and extend over several sections. The rerouting flanges 34 enter in each case into diagonal recesses, provided with guide members 35, of a guide plate 36 of a relatively great length extending in the transverse direction over all of the sections. On the underside of the guide plate 36 is the table 41 which also extends correspondingly over all of the sections of the device; and, correspondingly-lengthened conveyor belts 42 and 43 are extended over the topside of the table 41.

Figures 3, 3A, 3B, 3C, 3D:
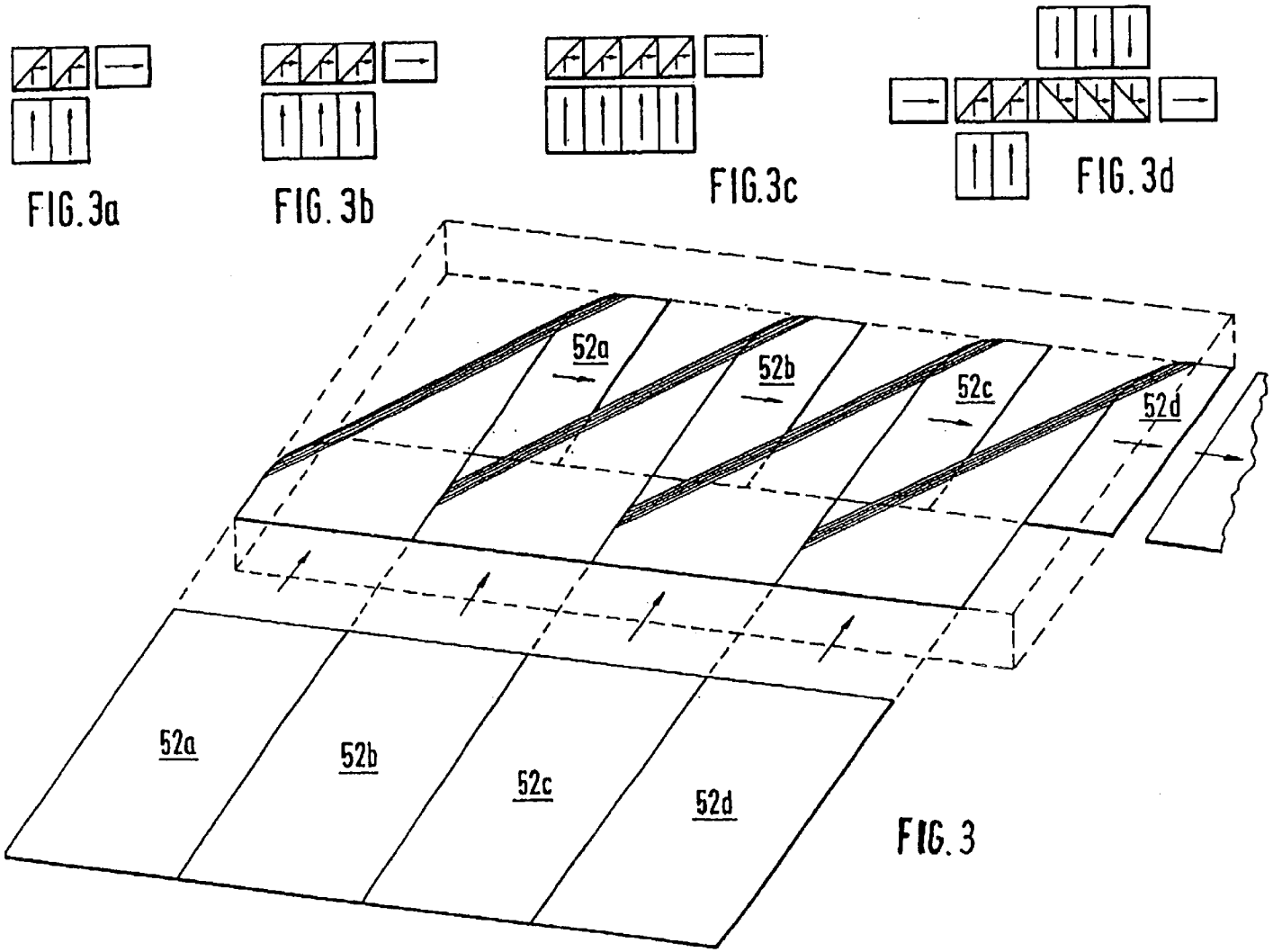
FIG. 3 is a perspective schematic view of the route of several sheets to be separately processed in devices of the type set forth herein; and, FIGS. 3a to 3d are schematic top views of ways of handling the sheets or forms, conveyed and turned in devices of the type disclosed herein, which are fed, for example in a mail processing machine, to a conveyor chain.

The above-described device solves the problem of turning several sheets that are fed side-by-side in a plane and separated from one another in the longitudinal direction, and to individually process and discharge the sheets in a direction perpendicular to the feeding direction, as shown schematically in FIGS. 3a–3d and in a perspective view in FIG. 3. After having been fed and turned and subjected to a change in the conveying direction, the handled sheets succeed one another in this new conveying direction in overlapping relationship. Sheet 52d lying on)he right with reference to the illustration of FIG. 3, for example, is transported by the discharge unit as the uppermost sheet while sheet 52a shown to lie on the left-hand side in FIG. 3 is discharged as the lowermost sheet. Thereafter, separation can be conventionally effected and does not cause any difficulties.

FIG. 3a schematically illustrates a top view of a two-section device of the invention. FIG. 3b shows a three-section device of the invention; and, FIG. 3c shows four sections of juxtaposed units 10 of the type shown in FIG. 1. FIG. 3d schematically illustrates that feeding units 11 can service a series of juxtaposed units 10 from both sides by merely respectively changing the orientation of the diagonal guide slots 33.

While the invention has been particularly shown and described with reference to preferred embodiments thereof, it will be understood by those skilled in the art that various changes in form and details may be made therein without departing from the spirit and scope of the invention. For more-secure guidance and rerouting of the sheets to be handled in the guide slot 33 and in the outlet slot 49, for example, it is possible to provide more than two conveyor belts such as 42 and 43 accompanied by associated rows of roll elements 39.

I claim:

1. A device for turning a conveyed sheet and simultaneously changing its conveying direction comprising:

*vertically spaced-apart upper and lower guide walls defining a longitudinally extending horizontal inlet slot lying in a first sheet plane, said inlet slot having a proximal end and a distal end and including first and second curved portions, respectively, at the distal end so as to define a diagonal bending slot having an axis of curvature in a plane substantially parallel to said first sheet plane;*

[an inlet slot defined by first and second side walls and lying in a first sheet plane;]

inlet driving means for driving a leading edge of said sheet into said inlet slot;

[first and second curved walls defining a bending slot located diagonally to said inlet slot and having axes of curvature in a plane substantially parallel to said first sheet plane;]

an outlet slot defined by third and fourth walls and located adjacent said bending slot and wherein said third wall includes a plurality of openings;

outlet drive means for seizing said sheet from said bending slot and driving said sheet through said outlet slot in a second sheet plane; and, a plurality of spherical roll elements located above said third wall but having portions thereof extending through said openings to contact said sheet as said sheet passes thereunder.

2. The sheet turning device of claim 1, wherein said outlet drive means includes:

conveyor belts for engaging at least one side of said sheet; and, said plurality of roll elements engages the other side of said sheet.

3. A device for turning a conveyed sheet and simultaneously changing its conveying direction comprising:

*vertically spaced-apart upper and lower guide walls defining a longitudinally extending horizontal inlet slot lying in a first sheet plane, said inlet slot having a proximal end and a distal end and including first and second curved portions, respectively, at the distal end so as to define a diagonal bending slot having an axis of curvature in a plane substantially parallel to said first sheet plane;*

[an inlet slot defined by first and second side walls and lying in a first sheet plane;]

inlet driving means for driving a leading edge of said sheet into said inlet slot;

[first and second curved walls defining a bending slot located diagonally to said inlet slot and having axes of curvature in a plane substantially parallel to said first sheet plane;]

an outlet slot defined by third and fourth walls and located adjacent said bending slot;

outlet drive means for seizing said sheet from bending slot and driving said sheet through said outlet slot in a second sheet plane;

feeding means for feeding each said sheet into said inlet slot; and, retaining means and means for containing said retaining means to selectively hold said sheet to selectively prevent said sheet from being driven by said inlet driving means.

4. The sheet-turning device of claim 3 wherein said inlet driving means includes low-friction surfaces for assisting in the selective prevention of said feeding of said sheet when it is being driven by said inlet driving means.

5. The sheet-turning device of claim 3 wherein said retaining means is comprised of a selectively-applied vacuum means having ducts therein for drawing said sheet thereto upon application of said vacuum.

6. A device for turning a conveyed sheet and simultaneously changing its conveying direction comprising:

*vertically spaced-apart upper and lower guide walls defining a longitudinally extending horizontal inlet slot lying in a first sheet plane, said inlet slot having a proximal end and a distal end and including first and second curved portions, respectively, at the distal end so as to define a diagonal bending slot having an axis of curvature in a plane substantially parallel to said first sheet plane;*

[an inlet slot defined by first and second side walls and lying in a first sheet plane;]

inlet driving means for driving a leading edge of said sheet into said inlet slot;

[first and second curved walls defining a bending slot located diagonally to said inlet slot and having axes of curvature in a plane substantially parallel to said first sheet plane;]

an outlet slot defined by third and fourth walls and located adjacent said bending slot;

outlet drive means for seizing said sheet from said bending slot and driving said sheet through said outlet slot in a second sheet plane; and, a swivelable means, said [first side] *upper guide* wall and at least a portion of said inlet driving means being attached to said swivelable means so that upward motion of said swivelable means causes upward motion of said [first side] *upper guide* wall and said portion of said inlet driving means away from said [second side] *lower guide* wall.

7. A device for *simultaneous* turning [a] *over of one or more* conveyed [sheet] *sheets* and simultaneously changing [its] *the* conveying direction *of the one or more conveyed sheets, said device* comprising:

an inlet slot defined by first and second side walls and lying in a first sheet plane;

inlet driving means for driving a leading edge of said sheet into said inlet slot;

first and second curved walls defining a *single* bending slot *for simultaneous turning over of one or more sheets or forms, said bending slot* located diagonally to said inlet slot and having axes of curvature in a plane substantially parallel to said first sheet plane;

said first *curved* wall forming an outer bend [and] having an inside surface and said second wall forming an inner bend [and] having an outer surface;

an outlet slot defined by third and fourth walls and located adjacent said bending slot;

outlet drive means for seizing said sheet from said bending slot and driving said sheet through said outlet slot in a second sheet plane at a higher speed than said inlet driving means for repositioning said conveyed sheet from said inside surface of said outer[-]bend [wall] to the outer surface of said inner[-]bend [wall].

*8. The device of claim 6 wherein the outermost portion of said first and second curved portion has a terminal edge positioned upstream of and adjacent to the second sheet plane, said terminal edge being spaced apart from each of said third and fourth walls of said outlet slot.*

*9. The device according to claim 8 wherein one of said upper and lower guide walls is integrally formed with the outermost wall of said first and second curved portions to provide a continuous cover plate and the other of said upper and lower guide walls is integrally formed with said second curved portion to provide a continuous guide plate, whereby said cover plate and said guide plate together form a continuous, enclosed channel extending from an entrance of said inlet slot to said terminal edge of said outermost portion of said first and second curved portion.*

*10. The device of claim 8 including at least one cut out formed through one of said upper and lower guide walls, said inlet driving means including at least one drive member extending through said cut out and into said inlet slot said drive member operative to drive the sheet from said inlet slot into said bending slot.*

*11. The device according to claim 8 wherein said terminal edge has a length which is at least as great as the width of a conveyed sheet.*

*12. The device according to claim 8 wherein said outlet drive means includes:*

*(a) at least one driven belt having a reach member thereof disposed in said outlet slot between said third and fourth walls;*

*(b) at least one roll member disposed in the innermost wall of said third and fourth walls opposite said reach member of said belt; and*

*(c) at least one member of said belt reach member and said roll member biased toward the other member, whereby said belt reach member and said roll member cooperate to seize and drive the sheet through said outlet slot.*

*13. The device according to claim 8 wherein said outlet drive means is operative to seize the sheet from said bending slot and drive the sheet through said outlet slot in said second sheet transport plane at a higher speed than said inlet drive means whereby the sheet is repositioned from an inside surface of said first curved portion to an outer surface of said second curved portion.*

*14. The device of claim 7 wherein the outermost wall of said first and second curved walls has a terminal edge positioned upstream of and adjacent to the second sheet plane, said terminal edge being spaced apart from each of said third and fourth walls of said outlet slot.*

*15. The device according to claim 14 wherein said first side wall and said first curved wall are integrally formed to provide a continuous cover plate and said second side wall and said second curved wall are integrally formed to provide a continuous guide plate, whereby said cover plate and said guide plate together provide a continuous, enclosed channel extending from an entrance of said inlet slot to said terminal edge of said bending slot.*

*16. The device of claim 14 including at least one cut out formed through one of said first and second side walls, said inlet drive means including a driven conveying member extending through said cut out and into said inlet slot, said conveying member operative to drive the sheet from said inlet slot into said bending slot.*

*17. The device according to claim 14 wherein said terminal edge has a length which is at least as great as the width of a conveyed sheet.*

*18. The device according to claim 14 wherein said outlet drive means includes:*

*(a) at least one driven belt having a reach member thereof disposed in said outlet slot between said third and fourth walls;*

*(b) at least one roll member disposed in the innermost wall of said third and fourth walls opposite said reach member of said belt; and*

*(c) at least one member of said belt reach member and said roll member biased toward the other member, whereby said belt reach member and said roll member cooperate to seize and drive the sheet through said outlet slot.*

*19. The device according to claim 14 including a swivelable means, at least a portion of said inlet slot and at least a portion of said inlet driving means being attached to said swivelable means so that upward motion of said swivelable means causes upward motion of said portion of said inlet slot and said portion of said inlet drive means away form the remainder of said inlet slot.*

* * * * *